No. 827,169.
PATENTED JULY 31, 1906.
A. E. MILLER.
BROOM SEWING MACHINE.
APPLICATION FILED NOV. 5, 1894.
11 SHEETS—SHEET 3.
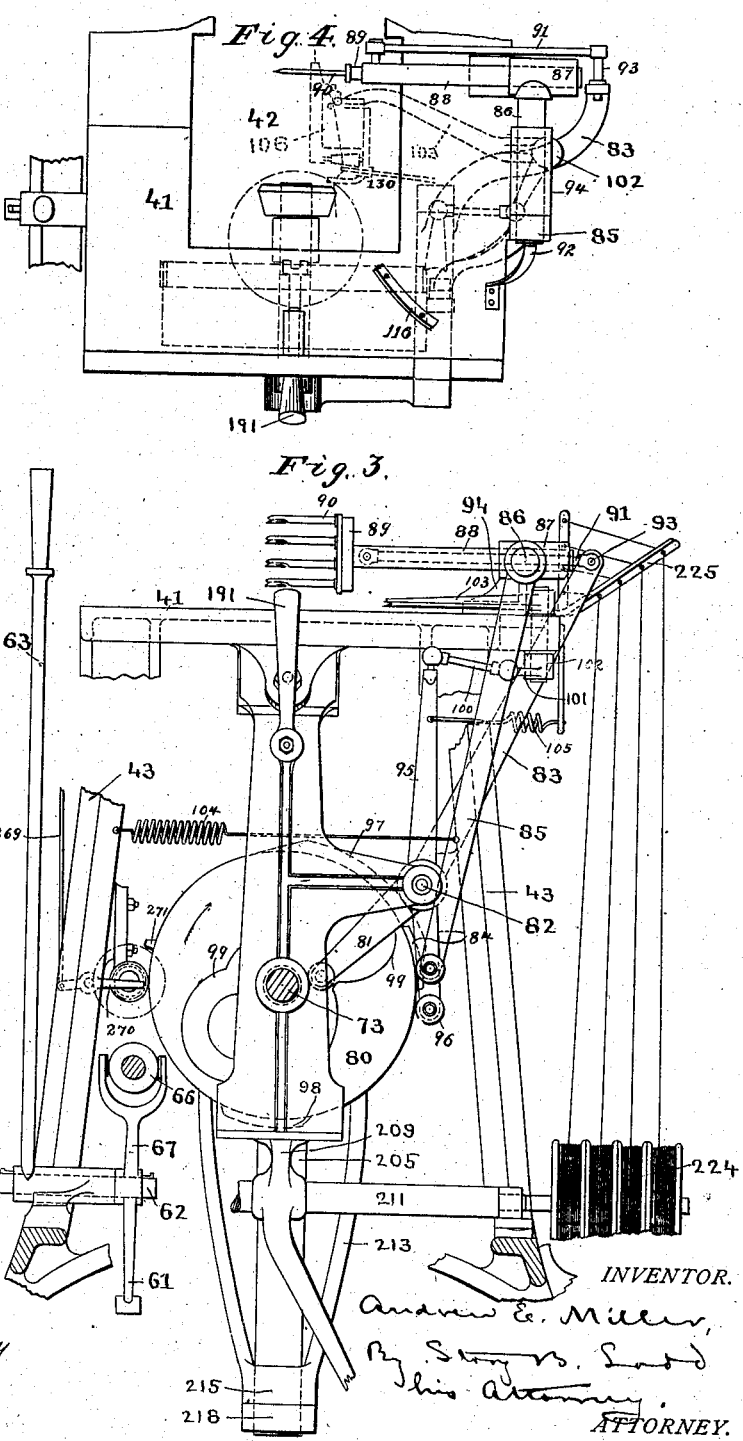

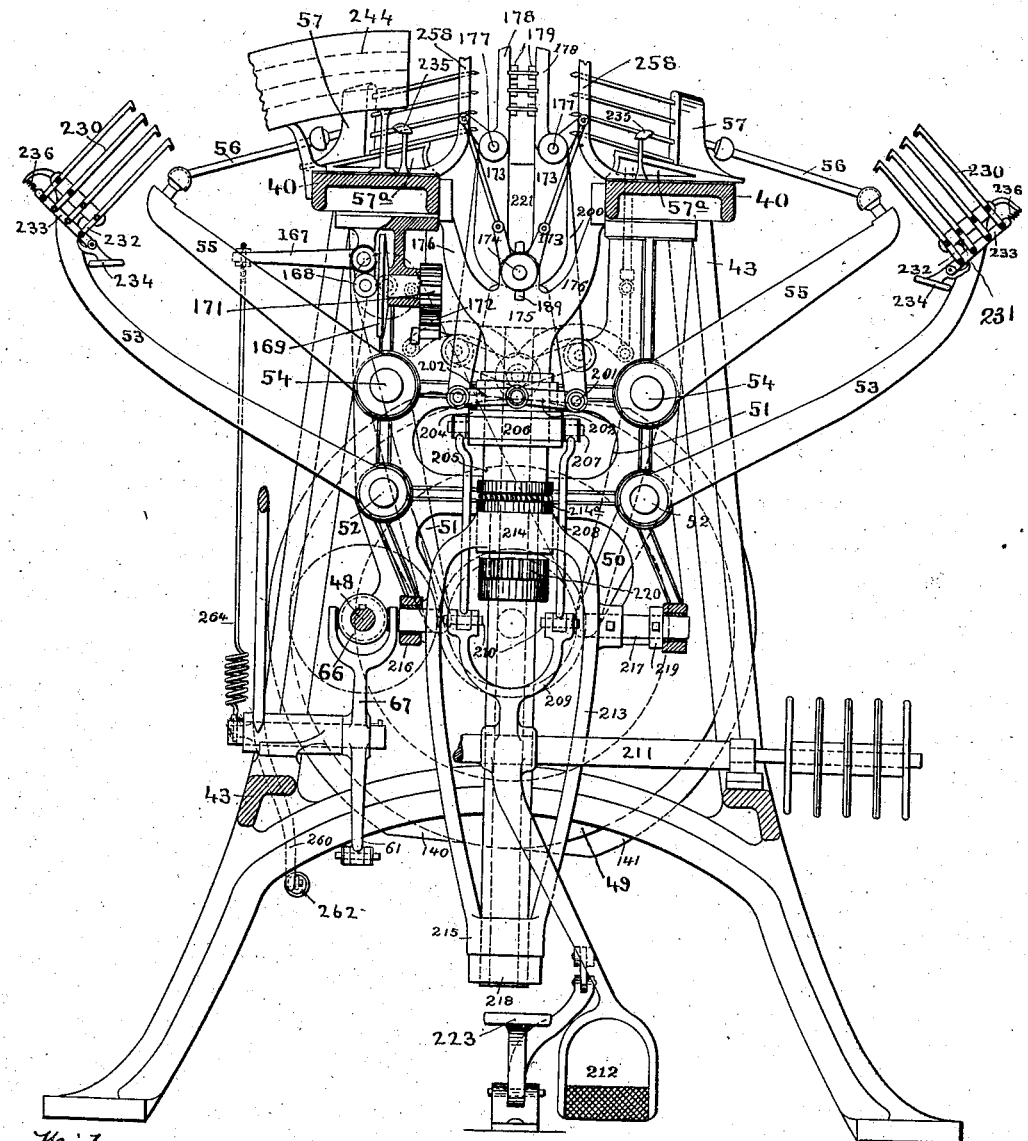

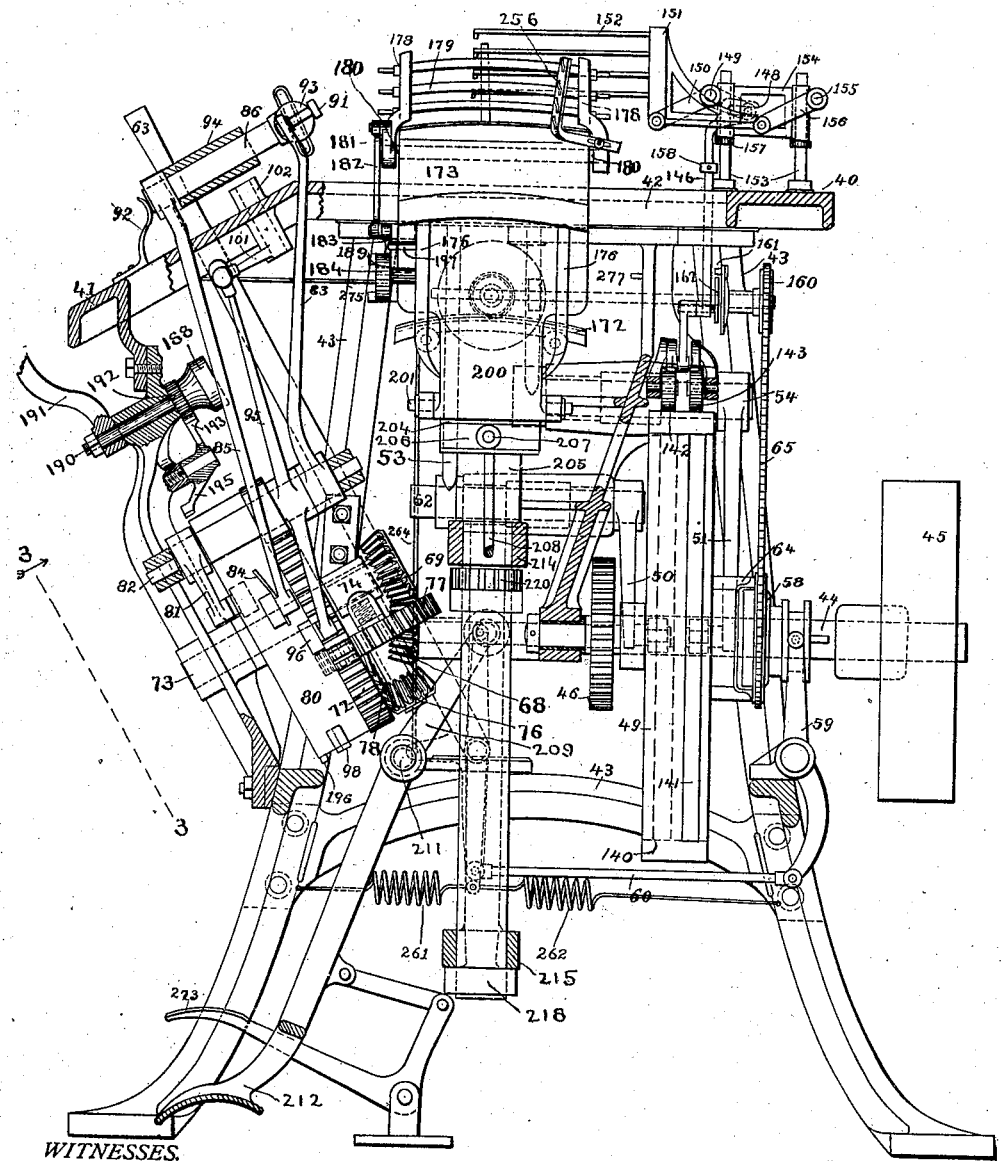

No. 827,169. PATENTED JULY 31, 1906.
A. E. MILLER.
BROOM SEWING MACHINE.
APPLICATION FILED NOV. 5, 1894.
11 SHEETS—SHEET 4.
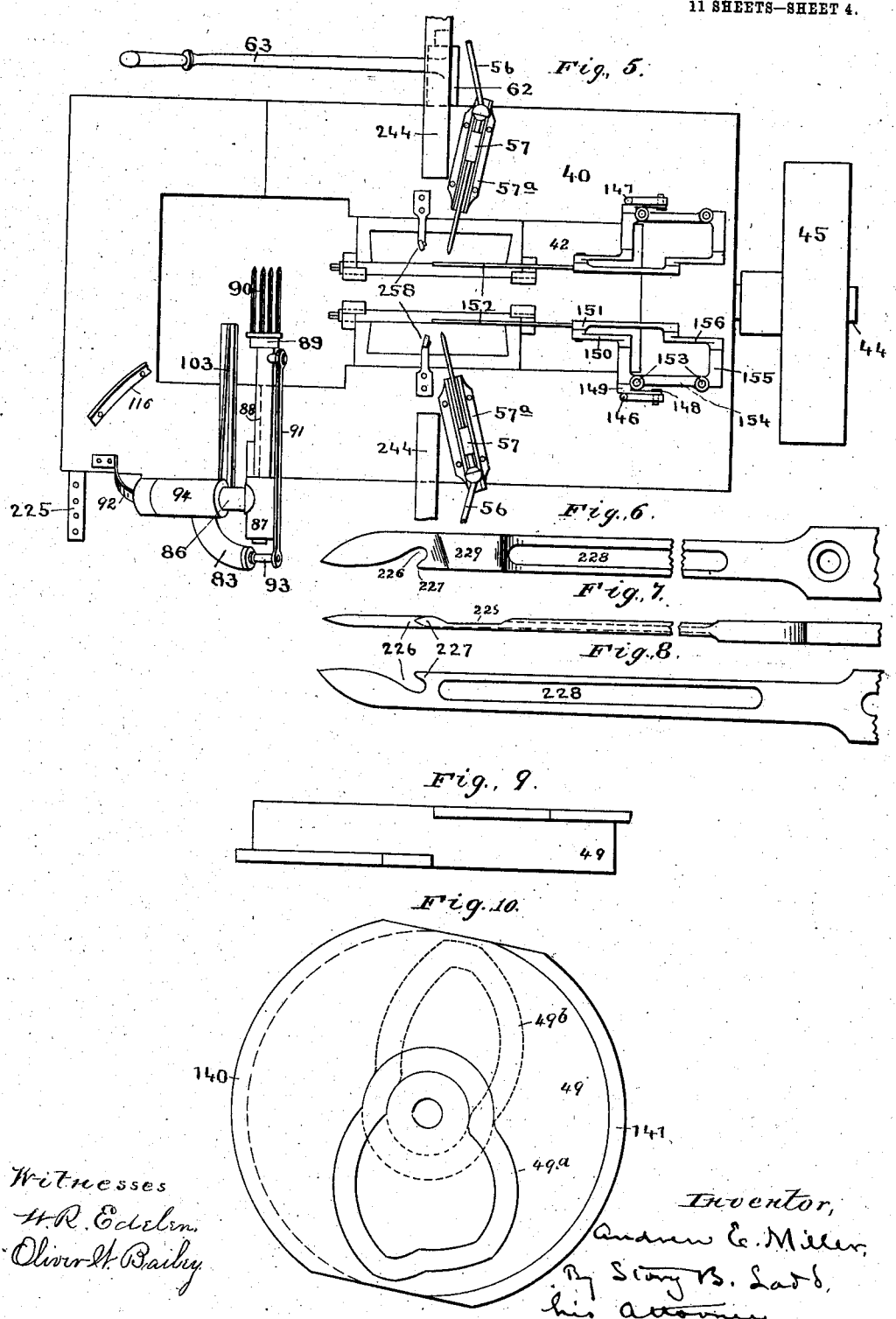

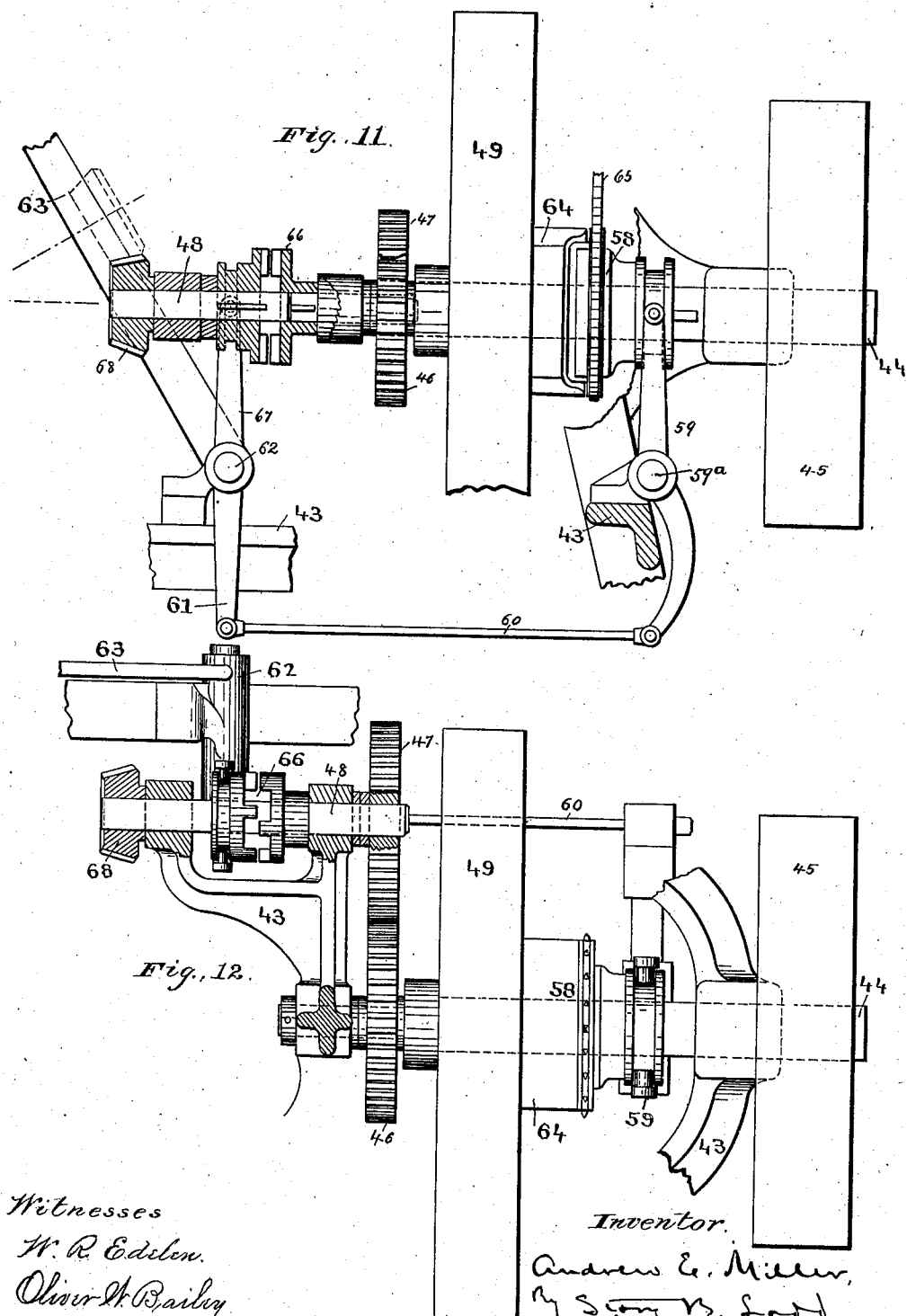

No. 827,169. PATENTED JULY 31, 1906.
A. E. MILLER.
BROOM SEWING MACHINE.
APPLICATION FILED NOV. 5, 1894.
11 SHEETS—SHEET 6.
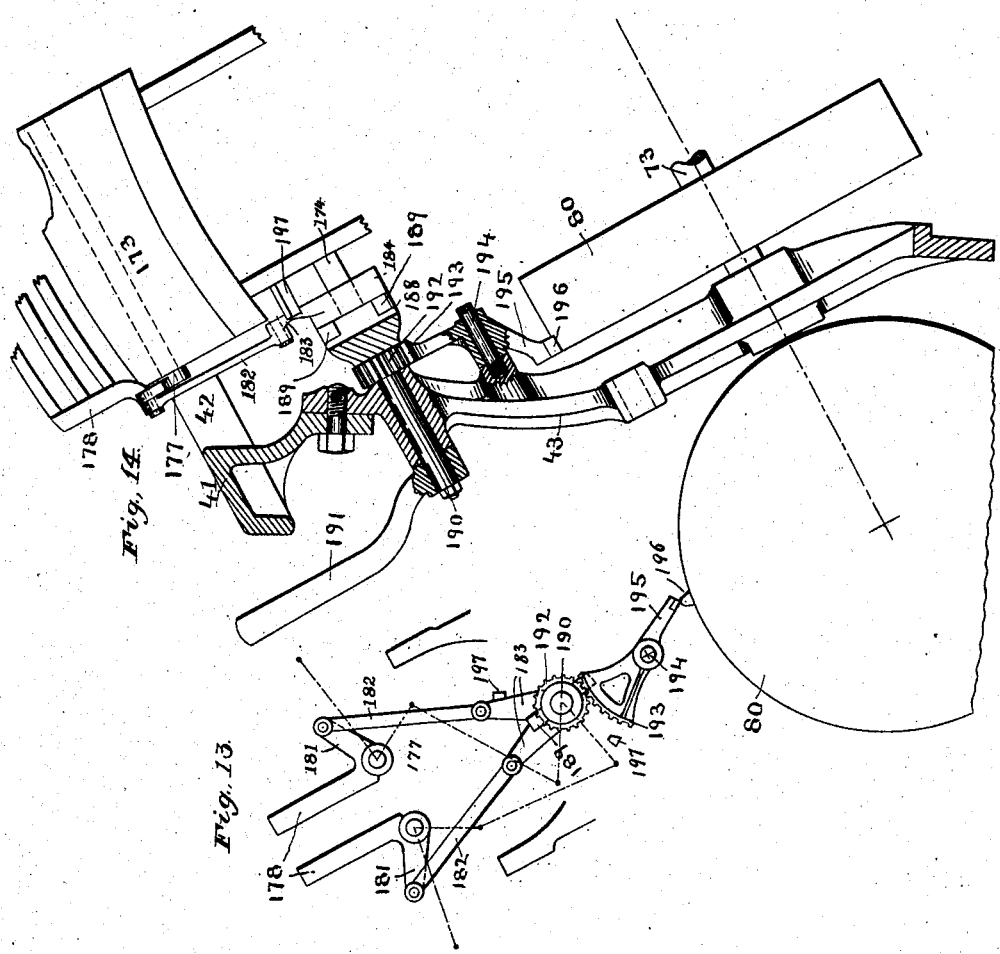
Witnesses.
W. R. Edelen.
Oliver H. Bailey
Inventor.
Andrew E. Miller,
By Stony & Scott
his Attorney.

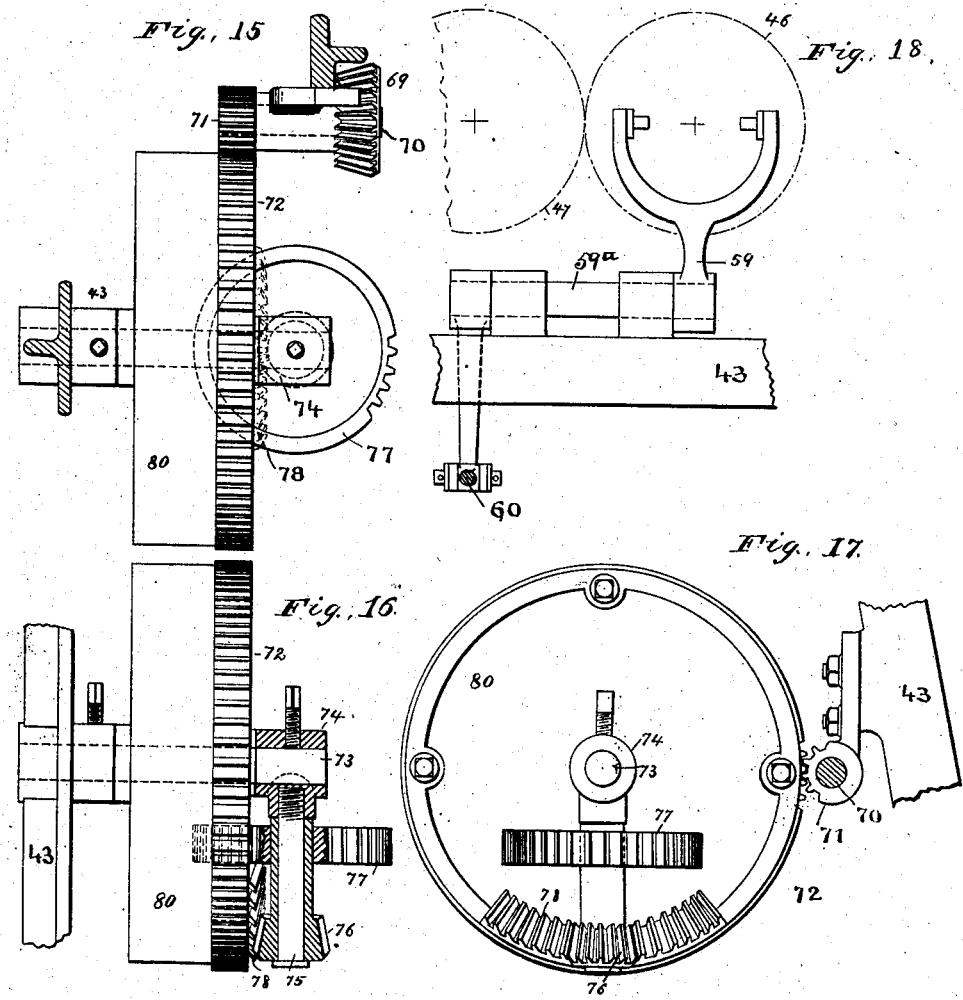

No. 827,169. PATENTED JULY 31, 1906.
A. E. MILLER.
BROOM SEWING MACHINE.
APPLICATION FILED NOV. 5, 1894.
11 SHEETS—SHEET 8.
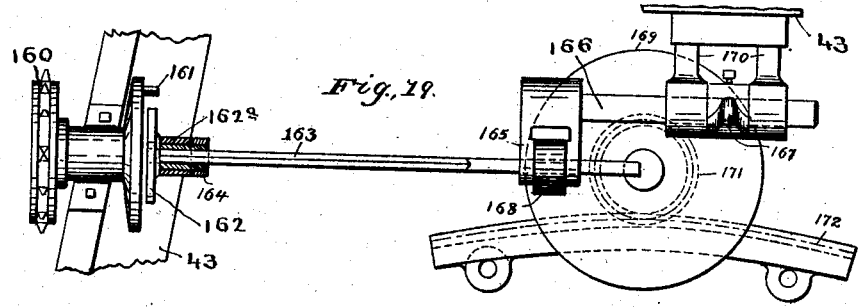
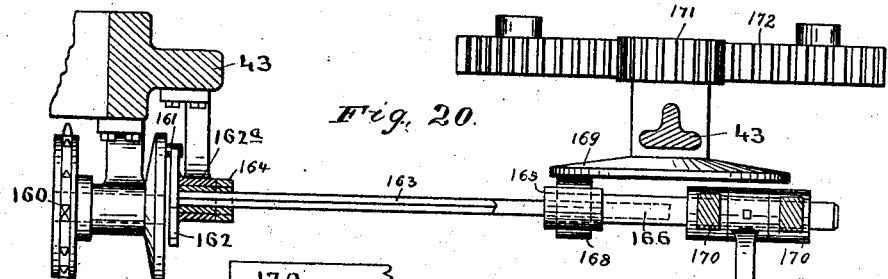
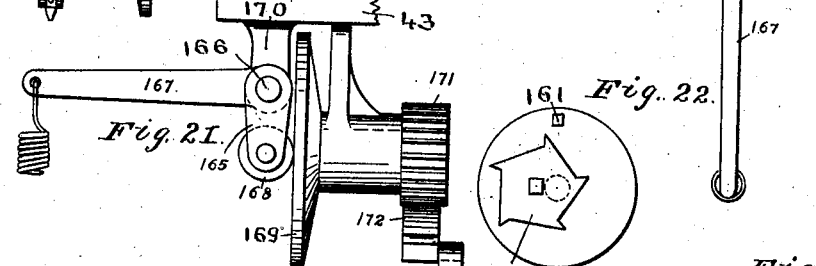
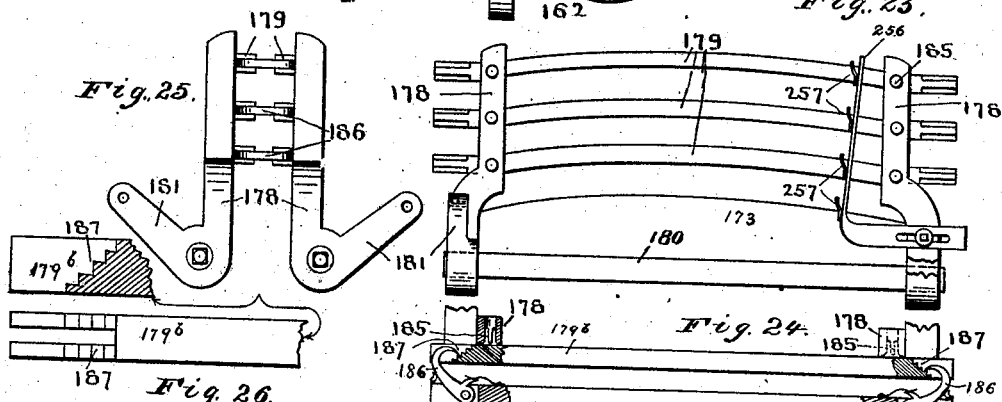
Witnesses.
H. R. Edelen.
Oliver H. Bailey.
Inventor.
Andrew E. Miller.
By Story M. Ladd
his Attorney.

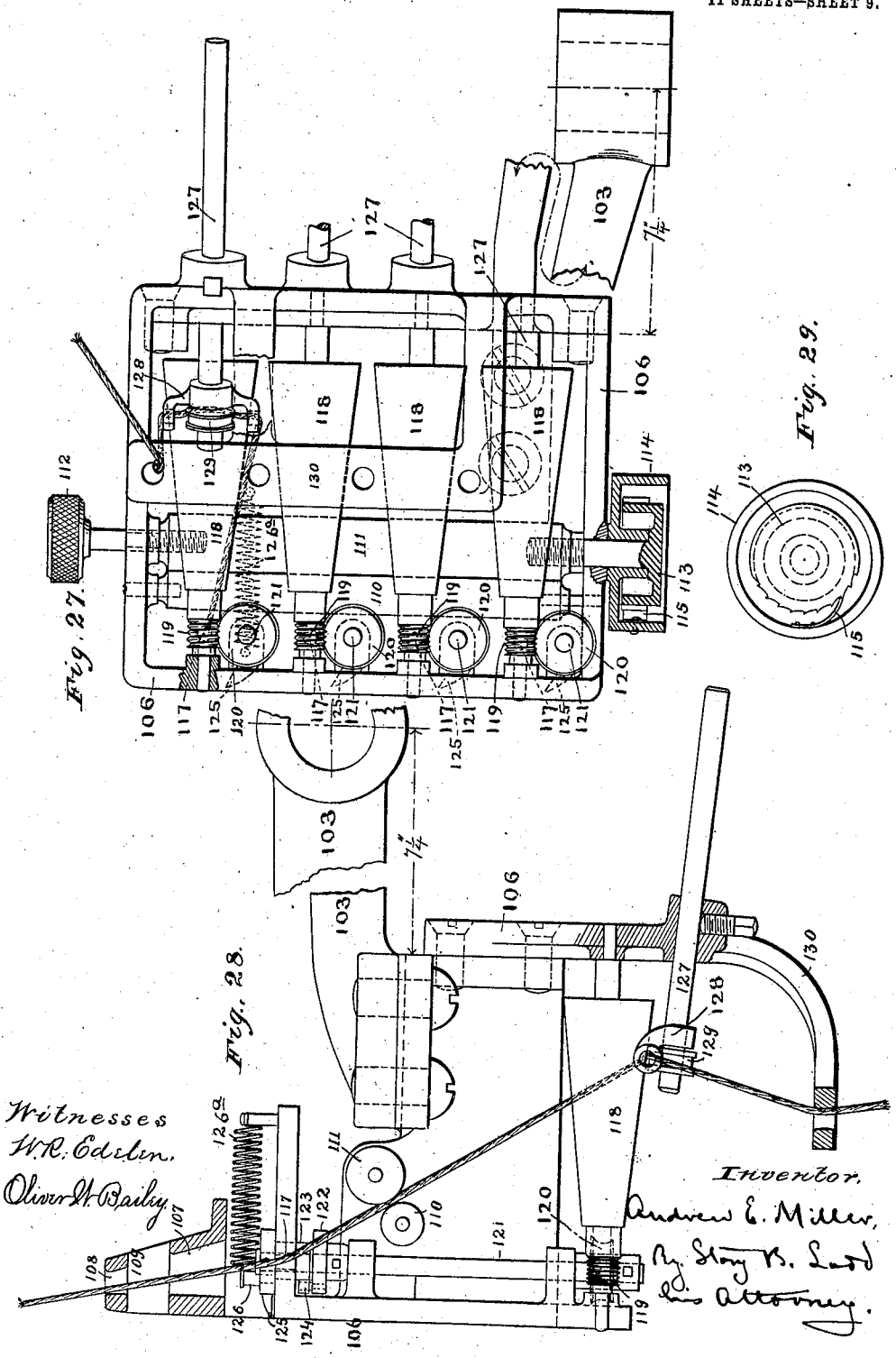

No. 827,169. PATENTED JULY 31, 1906.
A. E. MILLER.
BROOM SEWING MACHINE.
APPLICATION FILED NOV. 5, 1894.
11 SHEETS—SHEET 10.
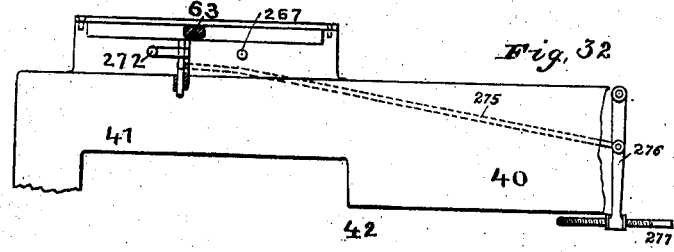
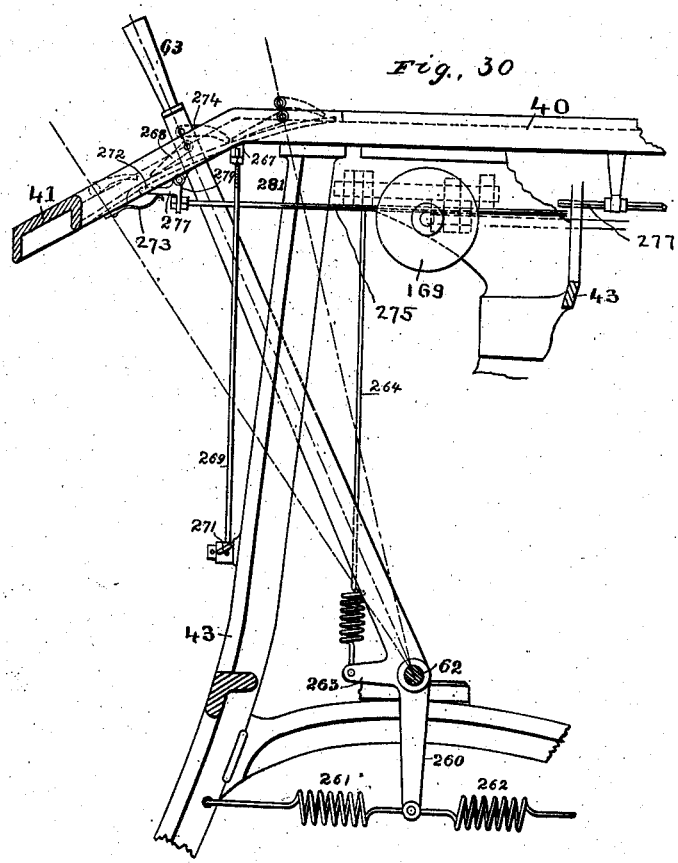
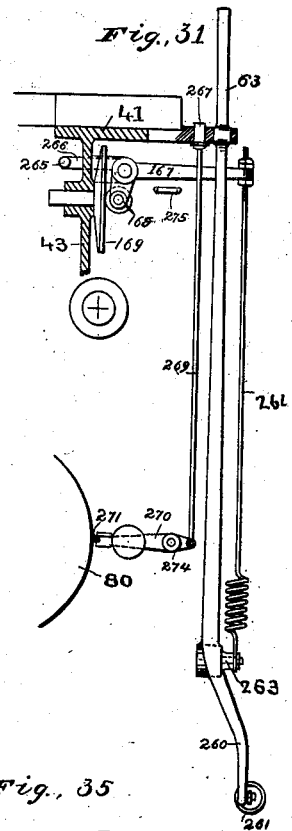
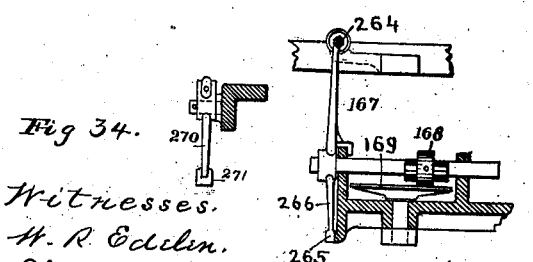
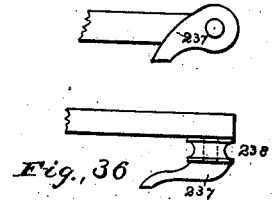
Witnesses.
H. R. Edelin.
Oliver H. Bailey
Inventor.
Andrew E. Miller,
By Story B. Smith
his attorney.

No. 827,169. PATENTED JULY 31, 1906.
A. E. MILLER.
BROOM SEWING MACHINE.
APPLICATION FILED NOV. 5, 1894.
11 SHEETS—SHEET 11.
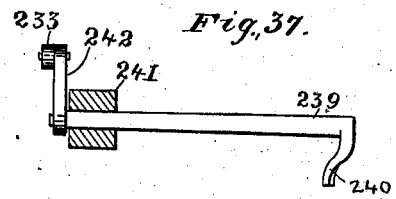
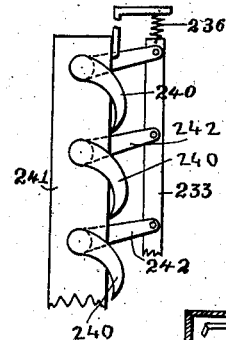
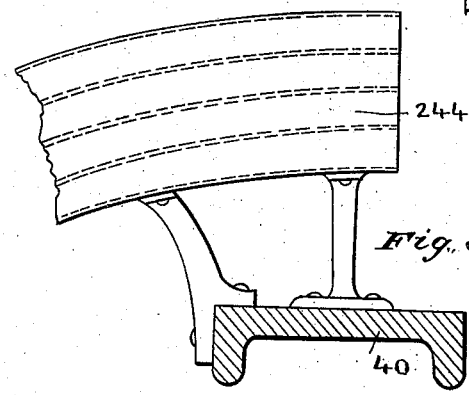
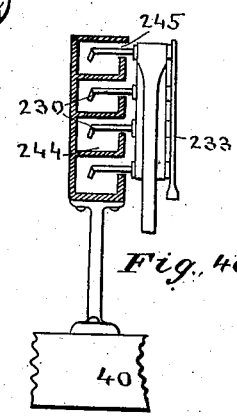
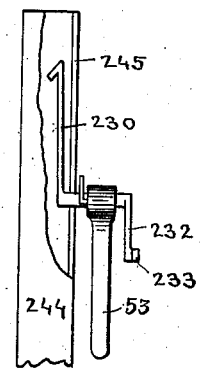
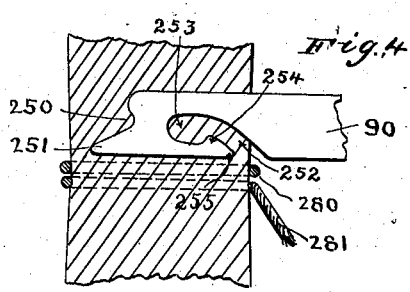
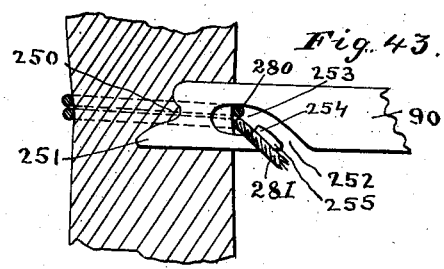
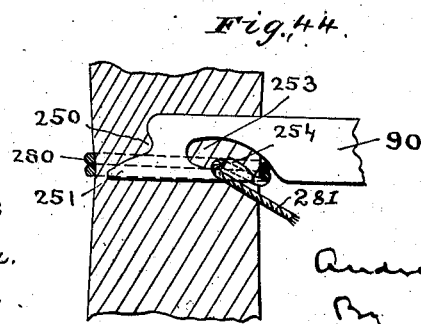
Witnesses
W. R. Edelen.
Oliver H. Bailey.
Inventor.
Andrew E. Miller,
By Story B. Scott,
his Attorney.

UNITED STATES PATENT OFFICE.

ANDREW E. MILLER, OF BALTIMORE, MARYLAND, ASSIGNOR, BY MESNE ASSIGNMENTS, TO HAMILTON CASSARD, OF BALTIMORE, MARYLAND.

BROOM-SEWING MACHINE.

No. 827,169.  Specification of Letters Patent.  Patented July 31, 1906.

Application filed November 5, 1894. Serial No. 527,911.

*To all whom it may concern:*

Be it known that I, ANDREW E. MILLER, a subject of the King of Great Britain, residing at Baltimore city, State of Maryland, have invented certain new and useful Improvements in Broom-Sewing Machines; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The object of the present invention is to provide a machine which shall greatly simplify the work of binding and sewing brooms, effect a great saving in time and labor, and reduce the cost of manufacture.

Heretofore after the broom-stock has been attached to the handle and prepared for binding and sewing the course of procedure has been, with the most approved appliances, to clamp the broom in the vise of the broom-sewing machine. Then the thread, cut to an approximate length, has one end tucked with the aid of a hand-tool into the broom and is passed around the broom by hand and the vise pushed into position for sewing. The thread has then to be connected to the sewing-machine, and the machine started. When the first row of stitching is completed, the vise has to be drawn back and the jaws loosened to allow the broom to drop down the distance between two rows of binders, and the several steps necessary to again clamp the broom, tuck the binding-thread, wind the binder, push forward the vise, connect the thread, and start the sewing operation—all separate hand operations—have to be again gone through with and the same again repeated for each binder. Each hand operation necessarily consumes time and requires close attention to secure uniform work.

The present invention aims to provide a machine which shall do the work of binding and sewing all the strands at the same time and shall automatically perform the several acts of tucking the threads, winding and tying the binders, measuring off and cutting the threads, and then the sewing of the several lines of stitching without requiring other attention on the part of the operator after the broom is clamped in the vise than the starting of the mechanisms. Thus skilled labor is not required for the work and great rapidity is obtained.

In the accompanying drawings, Figure 1 is a transverse sectional elevation of the sewing portion of the machine, the line of section being taken between the binder and the sewing mechanism. This is essentially a front view of the machine with the binding mechanism removed. Fig. 2 is a sectional side elevation of the machine, taken through the center of the sewing portion thereof and showing the vise and the binder in side elevation. Fig. 3 is a front elevation of the binder with portions of the frame in section, the line of view being indicated by the dotted lines 3 3 of Fig. 3. Fig. 4 is a plan view of portions of the binder. Fig. 5 is a plan view of the top frame of the machine and the operative parts carried by the same. Figs. 6, 7, and 8 are respectively side, bottom, and reversed side views of one of the sewing-needles. Figs. 9 and 10, are respectively side and edge views of the cam-wheel for operating the threading, sewing, and unthreading levers of the sewer. Fig. 11 is a detail side elevation, partly in section, of the main driving shaft and clutch therefor and countershaft with clutch for operating the binder. Fig. 12 is a plan view of the same. Fig. 13 is a front view of the carriers for the auxiliary jaws of the vise and devices connected therewith for opening and closing the carriers. Fig. 14 is a side sectional elevation of the same, showing in part the auxiliary jaws for gripping the broom. Figs. 15 and 16 are respectively a plan and side elevation of the cam-wheel of the binder and the gear connections therewith for revolving the vise. Fig. 17 is a rear view of this cam-wheel and gear mechanism. Fig. 18 is a detail view of the rock-shaft and clutch carried by the main driving-shaft. Figs. 19 to 22, inclusive, illustrate the sewing-feed mechanism for the vise. Fig. 23 is a side view of the carriers and auxiliary jaws for gripping the broom, the same being shown in plan in Fig. 24, and in end elevation by Fig. 25. The construction of the ends of the auxiliary jaws is illustrated in detail by Fig. 26. Fig. 26ª is a detail view of a slightly-modified form of lock for connecting the bars of the auxiliary jaw together. Fig. 27 is a vertical side elevation of the threading-head of the binder, the same being shown in plan view, partly in section, by Fig. 28. Fig. 29 is a bottom view of the ratchet-wheel attached to the bottom of one of the pressure-rollers of this threading-head. Fig. 30 shows in side elevation the starting-lever and connections therefor for controlling the binder and the sewer, the same being illustrated in end view by Fig. 31 and in plan by Fig. 32. Figs. 33 and 34 are views further illustrating the details of the intermittent feed for the sewing mechanism. Figs. 35 and 36 illustrate a modified form of unthreading-hook and a further modification in which the shank of the hook is rotated as illustrated by Figs. 37 and 38. Figs. 39, 40, and 41 are side and transverse sectional views of thread tubes or guards to receive the threads from the unthreading-hooks and hold them apart from each other; and Figs. 42, 43, and 44 illustrate the successive positions of the threading-needle in tying the thread after the broom has been wound.

The machine comprises a vise for the broom which admits of an oscillating movement on a center to bring the broom first into position for binding by means of the binding mechanism and then into position for sewing, the said broom-vise being also capable of revolving on its axis during the binding operation; a set of separate detachable auxiliary clamps which grip the broom along the several lines of binders and hold it compressed and in proper shape during the binding and sewing operation, and jaw-operating devices whereby the arms of the vise engaging with and carrying the auxiliary clamps are thrown out of engagement with the clamps when the binding operation is to take place.

Further features of the invention include the inclination given to the framework of the binder and the operating parts thereof with respect to the sewing-machine proper, whereby the swinging of the vise on its center brings it into an operative position with respect to either part of the machine; also the mechanism for binding and sewing any number or all of the threads at the same time, the special form of the hooks and needles employed, and their arrangement whereby the needles engage with and push the thread through the broom in making the stitch instead of first passing through and catching the thread and then drawing it through the broom, as has heretofore been the custom in machines of this class.

Further features of the invention consist of the threading-head and cutting mechanism, whereby the threads are automatically brought into position for engagement with the threading-needles and the proper length of thread for the binding and sewing of the broom is cut off; further, the unthreading mechanism and the coöperating parts of the sewing-machine; the automatic intermittent feed for the vise; the thread guards or holders for the loose ends of the threads, and other points of novelty hereinafter described.

It will be seen that in some cases in the accompanying drawings the teeth of gears and pinions are indicated for a part of the circumference only; but it will be understood, as is usual in the case of working drawings, that the teeth continue around the entire circumference of the gear or pinion unless otherwise expressed.

The top of the frame of the machine consists of a horizontal bed or table 40 for that portion of the machine comprising the sewing-machine proper and an inclined bed 41 for the portion which comprises the binding part of the machine. The operator stands at the end of this inclined portion of the frame. This table 40 and 41 has a central opening 42 for the vise, which opening along the portion of the bed of the sewing-machine is of a width to just receive the broom-vise when closed, the sides of the opening forming guideways for the vise. At the binding end of the table this central opening widens out, as shown by Figs. 4 and 5, to allow for the opening of the jaws and the revolution of the vise as hereinafter described. This table or bed 40 41 is supported on the frame 43, which is properly braced and carries the necessary hangers and supports for the bearings and operative parts of the machine. As the frame may take any shape which the economical constructions of the machine and proper bearings for the shafts and mechanisms require, it will not be necessary to describe it in detail or to designate the bearings of the several shafts, rock-shafts, and cam-wheels.

Power is applied to the machine through the medium of a main driving-shaft 44, having a driving-pulley 45, said shaft being located midway between the sides of the machine and extending rearward from near the center thereof. The binding mechanism is operated from a counter-shaft 48, (see Figs. 1 11, and 12,) which is driven by intermeshing gears 46 and 47, the former being secured to the main shaft and the latter to the counter-shaft. The sewing mechanism is operated by a cam-wheel 49, which may be clutched to the main shaft, and the mechanism for feeding the vise-jaws which hold the broom-head to the sewing mechanism is operated from the main shaft by means of a sprocket-wheel 58 upon the main shaft and a sprocket-chain 65.

The counter-shaft 48, from which the binding mechanism is operated, is a divided shaft with the two end parts thereof connected by a clutch 66. (See Figs. 11 and 12.) The sliding member of this clutch is operated by the lever-arm 67, carried by the rock-shaft 62, and controlled by the starting-lever 63. At the end of this shaft 48 there is a bevel-gear 68 for driving the binding mechanism, which mechanism is thus thrown in or out of action by means of the clutch 66. The bevel-gear 68 engages with its mate 69, carried by the shaft 70, (see Figs. 15 and 17,) which has a pinion 71, that drives a large spur 72, as clearly shown in Figs. 15, 16, and 17. This large gear is attached to a cam-wheel 80, the gear running loosely on a stud-shaft 73, firmly attached to the frame of the machine.

The cam-wheel 80 has on its front face a cam-groove, (shown in Fig. 3,) in which travels a friction-roller carried by the lever 81, which lever is attached to the rock-shaft 82, the latter carrying the main lever 83 for operating the loop-forming device. On the periphery of the cam-wheel 80 for a short distance there is an oblique flange 84, (see Figs. 2 and 3,) and traveling on the outer periphery of the cam-wheel there is a roller carried by an arm or lever 85, which arm is keyed to the end of the rock-shaft 86, just above the bed 41 of the binder, and this rock-shaft 86 carries at its opposite end the bearing 87 for a sliding rod 88, to which is fastened the looping needle-head 89, the said head carrying a gang of looping-needles 90. A connecting-rod 91 connects the slide-rod 88 with the lever-arm 83. The couplings of the connecting-rod 91 with the sliding rod 88 and the arm 83, respectively, are made with ball-joints to take off undue strain due to the lateral shifting of the needle-head. 92 is a spring (shown in Figs. 2 and 4, but omitted in Fig. 3) bearing against the end of the rock-shaft 86 to hold it in its normal position, and by means of the flange 84 on the cam-wheel 80 this rock-shaft is given a slight longitudinal displacement for a purpose hereinafter explained when the roller on the end of the lever-arm 85 strikes the flange 84, and is thereby laterally shifted.

The devices now being described comprise the looping mechanism which effects the initial attachment of the binding-twine to the broom-head and the looping of the threads around the strands of the binder after the broom is wound, and in order that this mechanism can be adjusted to brooms of different widths the rock-shaft 86 is laterally adjustable in the hub of the rocker arm or lever 85, and the coupling-pin 93, which connects the lever-arm 83 with the connecting-rod 91, is also made laterally adjustable with respect to the lever. The rock-shaft 86 is journaled in a bearing 94, carried on the table-frame 41. Mounted on the rock-shaft 82 and loose thereon is a lever 95, the short arm of which carries a roller 96, traveling on the periphery of the cam-wheel 80. The ridge on the periphery of the cam-wheel, which determines the movements of the roller 96 and the lever and mechanism operated thereby, is indicated at 97, while the ridge operating the rocker-arm 85 is shown at 98 on the periphery of the cam-wheel. (See Figs. 2 and 3.)

The cam-groove in the face of the wheel, in which the friction-roller of the rocker-arm 81 travels, is in part shown at 99. (See Fig. 3.) The upper arm of the lever 95 is connected, by means of a connecting-rod 100, to an arm 101, carried by a vertical rock-shaft 102, which rock-shaft extends up through the table of the binder and carries above the table the threading-head arm 103. The couplings at the ends of the connecting-rod 100 are preferably made with ball-joints to allow free play to the connections. Attached to the cam-levers 85 and 95 there are suitable tension-springs 104 and 105, respectively, Fig. 3, to hold them against their respective operating cam-surfaces.

On the end of the arm 103 there is a threading head or casing 106, which is intermittently moved through the arc of a circle parallel with the involved portion of the arm 103 to bring the thread in front of the needles 90. This threading-head is illustrated in detail in Figs. 27, 28, and 29, and its position on the machine is indicated in dotted lines in Fig. 4, the arm 103 being shown broken off in Figs. 3 and 5 to bring to view the looping-needles. It is shown in the present case with sets of devices for holding, feeding, and cutting four threads, the machine thus being adapted for any number of binders up to four, others being added if more are required. The threading-head brings the several threads into proper position with respect to the several needles 90, so that each needle may engage with one of the threads and carry it into the broom. The threading-head casing has a series of funnel-shaped or tubular thread-guides, one of these thread-guides being shown in Fig. 28 at 107 108. These tubular thread-guides are arranged in a vertical series one above the other, and they are cut through by a vertical slot for the passage therethrough of the needles 90, this slot appearing in Fig. 28 at 109, dividing the thread-guide into the two sections 107 and 108, before referred to.

The needle-slot 109 may be a single slot traversing the series of tubular thread-guides, the object of the thread-guides being to properly present the threads to the needles in order that the latter may engage with their respective threads just prior to entering the broom. For securing a proper tension on the threads and also for feeding them forward there are two vertical pressure-rollers 110 111, between which the threads pass. The roller 111 is provided with a thumb-wheel 112 on the top of the threading-head for use in adjusting the threads or bringing them forward by hand, while at its bottom end this roller carries a ratchet-wheel 113, rotated by a loose friction-wheel 114, surrounding the same and having a pawl 115 engaging with the ratchet. Mounted on the table of the binder there is an arc friction-plate 116, Figs.

4 and 5, with which the friction-wheel 114, Figs. 27 and 29, engages when the arm 103 makes its stroke, and when it makes its forward stroke the roller 11 is rotated and the threads advanced sufficiently to carry them through the funnel-guides and past the needle-slot 109. Between the feeding-rollers and the cone-thread guides 107 each thread passes through an eye 117, in conjunction with which there operates a rotary cutter 125, hereinafter described. The shaft of each cone has a worm 119, which engages with a worm-wheel 120, carried on a shaft 121 transverse to the cone-shaft. Each of the shafts 121 carries at its forward end a dog 122, Fig. 28, and fitted on the end of the shaft there is a loose sleeve 123, having a lug 124, with which the dog 122 engages when the shaft 121 is rotated, and to said sleeve 123 is attached a radially-projecting knife 125 for severing the thread at the proper instant.

Projecting from the side of the knife there is a pin 126, to which is attached a spring 126$^a$, the other end of which is fastened to the frame of the threading-head. When the knife is rotated through the agency of the dog, it moves round until the pin 126 passes the center, when the tension-spring 126$^a$ causes it to complete its rotation with a quick stroke across the face of the threading-eye 117, cutting the thread. Contiguous to each of the cones 118 there is an adjustable stud 127, carrying a pair of threading-eyes at the ends of a yoke 128, and loosely mounted on the stud between the threading-eyes there is a thread-guide roller 129. The studs 127 are set parallel with the sides of the cones and are longitudinally adjustable in the threading-head frame, so that the threads supported by them can be shifted with respect to the cones and cause to travel around the larger or smaller parts of the cone, as desired. The threads bearing against their respective cones 118 in passing from the supports just described to the tension-rollers 110 111 revolve the cones and effect the rotation of the knife 125. By properly setting the studs 127 the number of revolutions of the cones as the threads are drawn through can be gaged so as to cause the knives to cut them in proper lengths. 130 is a guide-arm with eyes for the several threads, the threads passing from the reels 224 to these eyes.

The vise proper has two main jaws 173, hinged at 174 to the vise-body 175, and the latter is carried upon a vertical hollow shaft 205, revolubly mounted in a stirrup-hanger 213, the latter being supported upon trunnions 216 and 217, so that the vise may be oscillated longitudinally of the machine. Two projecting guide-arms 176 extend outward on each side of the vise-body and carry guide-plates, which slide on the side faces of the central opening 42 of the top plate. These guide-plates may be made adjustable, or the bearing side faces of the frame may be formed of adjustable plates to allow for the taking up of the wear of the guide-faces. Hinged to the jaws at 177 are the carriers 178 for the auxiliary jaws 179 for gripping the broom. The carriers 178, of which there are a pair at both ends of the main jaws, are fastened to rock-shafts 180, and on the front end of the jaws the carriers have crank-arms 181, connected by links 182 with crank-arms 183, carried by a turn-collar 184 on the front end of the center bolt of the jaw-hinge 174. (See Figs. 13 and 14.)

The auxiliary jaws 179 are removably attached to the carriers 178 by means of split-spring bolts 185, (see Fig. 24,) entering eyes in the carriers and which allow the carriers to pull off from the auxiliary jaws when the carriers are swung back during the binding operation and leave the clamps or auxiliary jaws fixed to the broom and then to attach themselves again when the operation is completed and the carriers are turned up against the auxiliary jaws. These auxiliary jaws correspond in number to the number of binding-threads and needles less one, the top edge of the vise-jaws 173 gripping the broom just below the bottom binder. Each auxiliary jaw consists of a pair of clamping-bars, one of which, 179$^a$, has at its ends spring-hooks 186, which fit into slots at the ends of the other member of the jaw 179$^b$ and catch into the end of the bar and lock the two together. The stepped notches 187 at the ends of the bar 179$^b$ allow the auxiliary jaws to close up as the broom is compressed and firmly hold the broom.

Instead of forming the stepped notches 187 at the ends of the bar 179$^b$, as above described, the inner faces of the spring-hooks 186 may be provided with a series of teeth adapted to successively engage with a single tooth or projection arranged within the adjacent slotted end of the bar 179$^b$ as the broom is compressed. Such construction is illustrated in Fig. 26$^a$ of the drawings.

The carriers holding these jaws are closed by means of a socket-wrench 188, having a slotted head which engages with lugs 189 on the turn-collar 184 when the vise is swung into position for binding. The socket-wrench 188 is on the end of a shaft 190, which at its outer end is provided with a handle 191 for operating the wrench by hand and opening the carriers at the start of the binding operation. The slot in the head 188 allows easy entrance of the lugged head of the turn-collar 184 and the horizontal motion of the vise when revolved in the binder. Mounted on the shaft 190 there is a pinion 192, which intermeshes with a segmental gear 193, mounted on a pin 194, carried by the frame, and said segmental gear has an arm 195, extending down in the path of a lug or tooth 196 on the periphery of the cam-wheel 80.

This tooth striking the arm 195 effects a turn of the wrench 188 and causes it to automatically close the clamp-carriers 178 when the binding operation has been completed. Lugs or stops 197 on the vise-body 175 limit the throw of the bell-crank 183.

The vise-jaws 173 have broad downwardly-extending side arms 200, which carry stud-pins 201, connected by links 202, Fig. 1, with stud-pins on the sliding collar 204. The side arms 200 have sufficient spring to allow for variations in the thickness of the brooms gripped in the vise, and in addition thereto the jaws may be made adjustable as to width of binding when closed to accommodate brooms of any size. The collar 204 slides vertically on the shaft 205 of the vise and is held thereon against axial movement by a feather. Fitted into this sliding collar and seated in a groove therein is a loose ring 206 with trunnion-bearings 207, to which are attached connecting-rods 208, which connect the same with the forked end of the main clamping-lever 209 by the pins 210. This clamping-lever 209 is fulcrumed on a shaft 211 and carries the stirrup-pedal 212 for operating the main jaws of the vise.

The vise-shaft 205 is supported by a stirrup-hanger 213, having collars 214 and 215 at the top and bottom which encompass the vise-shaft and trunnions 216 and 217, journaled in bearings carried by the frame. The upper collar 214 bears under a shoulder on the vise-shaft, a spring-washer 214ª, Fig. 1, being interposed to take up any wear of the vise-column on its supports, for it is important to hold the top of the jaws at a constant level and in true position with respect to the needles. On the bottom of the vise-shaft there is an adjustable collar 218, which allows the top of the vise to be accurately set with respect to the needles and when removed allows the vise and its shaft to be lifted out of the hanger. The bearing for the trunnion 217 is set back a short distance from the stirrup-hanger, and the extended trunnion 217 carries a set-collar 219. When this collar is loosened, the trunnion-shaft 217 can be slipped through its bearing until the trunnion 216 clears its bearing, and then the stirrup-hanger can be taken out. The centers of the pins 210 are concentric with the axis of the trunnions 216 and 217 of the stirrup-hanger of the vise-shaft when the vise is closed with a broom clamped therein.

On the end of the stud-shaft 73, Figs. 2, 15, 16, and 17, there is fastened a collar 74, which carries a stud 75, (see Fig. 16,) on which is hung a bevel-pinion 76 and a spur-gear 77, both attached to a common sleeve, and on the face of the large gear 72 there is a segment of a bevel-gear 78, meshing with the beveled pinion 76. On the vise-shaft, below the hanger-ring 214 and keyed thereto, there is a spur-gear 220, which meshes with the gear 77 when the vise is swung over into position for binding, the rotation of these gears and the vise-shaft being effected through the medium of the segmental gear 78 and pinion 76.

At the top of the vise-shaft there is a vertically-adjustable socket-seat 221 for the broom fitted within the upper end of the tubular spindle 205 and held by a set-screw, by means of which the vertical position of the broom is regulated. On one side of the vise-body there is carried a segment-gear 172 for the feeding mechanism. Another point to be noted is the secondary foot-lever 223, connected by bell-crank and link with the primary foot-lever 212 for the purpose of lifting the latter and pulling down the collar 206 and opening the main jaws. Carried on the shaft 44 there is a large cam-wheel 49, provided with a cam-groove 49ª and 49ᵇ, respectively, Fig. 10, on each side face, in one of which cam-grooves, 49ª, travels the friction-rollers on the ends of the duplicate rock-shaft arms 50 and in the other cam-groove 49ᵇ travels the friction-rollers carried by the duplicate rock-shaft arms 51. The rock-shafts 52 52, to which are respectively attached the cam-controlled lever-arms 50 at one end, carry at their opposite ends the unthreading-levers 53, it being understood that these parts are necessarily duplicated on the two sides of the sewing-machine.

The cam-controlled lever-arms 51, in like manner carried by the rock-shafts 54, operate the main sewing-levers 55 55, attached to the opposite ends of their respective rock-shafts. The sewing-levers 55 55 are coupled by connecting-rods 56 56 with the sewing-needle heads 57, which latter slide in guideways 57ª 57ª, mounted on the table 40 in proper position with respect to each other on opposite sides of the central opening 42, and said guideways have a slight upward inclination and are also obliquely set with respect to the line of sewing, as clearly illustrated in Figs. 1 and 5, to give the proper entrance for the needles into and through the broom in order that the needles may pass under the binding-threads on the entering side of the broom and out above the binding-threads on the opposite side. The coupling-rods 56 56 are preferably connected with ball-and-socket joints to the needle-head 57 and to their lever-arms 55 55. The cam-wheel 49 is loose on the driving-shaft 44 and is coupled thereto when the sewing mechanism is to be operated by means of a sliding clutch 58, the movable member of which is operated by a clutch-lever 59, carried by a rock-shaft 59ª, (see Figs. 11, 12, and 18,) and the lower arm of this rock-shaft is connectd by a rod 60 with an arm 61, carried by a rock-shaft 62, to which is fastened the starting-lever 63. The hub 64 of the cam-wheel 49, which hub also forms one-half of the clutch, carries a sprocket-wheel, around which passes a sprocket-chain 65, which operates the vise-feeding mechanism hereinafter described.

The cam-wheel 49 carries in its outer surface two cams 140 and 141, Fig. 2, which operate, respectively, levers 142 and 143. These levers connect, by means of connecting-rods, with the vertically-sliding rods 146. As these parts which operate the threading-hooks are alike on the two sides of the machine, a description of one set of devices will be sufficient. The rod 146 is provided at its upper end with a fork which engages a pin 148, fastened to the lever-arm of the rock-shaft 149, Figs. 2 and 5, and this rock-shaft by the arm 150 is connected to the threading-hook head 151, carrying the gang of threading-hooks 152. Sliding on standards 153 there is a head 154, which carries at one end the rock-shaft 149 and has at the opposite end a corresponding bearing 155. A link 156 connects said latter bearing with a rear arm of the threading-hook head and gives a parallel motion to the gang of threading-hooks, whereby they always preserve a horizontal position. The standards 153 are provided with collars or shoulders 157, on which the frame 154 rests when in its lowest position, and carried on the rod 146 there is a collar 158, which strikes the frame 154 and raises it during the latter part of the upward stroke of the rod, thereby giving a vertical movement to the threading-hooks 152. The upward movement of the rod 146 first causes the threading-hooks to transcribe an arc of a circle downward and backward, followed by an upward movement when the frame 154 is lifted by the collar 158. A spring (not shown) holds the frame 154 down on its seat until it is raised by the collar 158.

The sprocket-chain 65 drives the sprocket-wheel 160 and the vise-feeding mechanism. On the inner end of the shaft of the sprocket-wheel 160 there is a dog 161, (see Figs. 2 and 19 to 22, inclusive,) and coöperating therewith is a toothed or star wheel 162, carried by a sleeve which has a central square opening which receives the end of a square shaft 163, and with each revolution of the sprocket-wheel the dog 161 engages with a prong of the star-wheel 162 and rotates its shaft through a small arc. This star-wheel and its shaft are set slightly eccentric with respect to the shaft of the sprocket-wheel 160. The sleeve of the star-wheel turns in the bearings 162ª, and it is held in place by a set-collar 164, fastened to the sleeve of the wheel. Near the inner end of the shaft 163 there is a movable bearing 165 for said shaft, which is rocked by a rock-shaft 166, which rock-shaft is operated by a lever 167, and when said lever-arm is drawn down, as hereinafter described, the bearing 165 swings forward and brings a friction-pinion 168, carried on the shaft 163, (and between two sections of the bearing,) against the face of a friction-disk 169, which latter is carried by a short transverse shaft. The friction-pinion 168 can be adjusted at any point between the center or the edge of the friction-disk 169 by shifting the rock-shaft 166 laterally in its bearings, thereby adjusting the speed of rotation of the friction-disk 169. For effecting this adjustment the lever 167 is attached to the rock-shaft 166 by a set-screw and is placed between a pair of hangers 170. On the opposite end of the shaft carrying the friction-disk 169 there is a spur-gear 171, which meshes with a segmental spur-gear 172, fixed to the side of the vise, and by means of which the vise, carrying the broom, is fed along past the sewing-needles. The feed of the vise and the length of the stitch can be regulated by means of the adjustable shaft 166.

The gang of twine-reels 224 are shown in Figs. 1 and 3 with the threads running to guide-eyes 225, carried on the binder-frame, and thence to the guide-eyes in the arm 130 of the threading-head.

The sewing-needles are of special form adapted to effect the pushing of the thread through the broom in lieu of hooking the thread and drawing it through. The needle is made with its point in line with the bottom edge of the needle-shank and slanting backward therefrom to the upper edge of the needle. A short distance behind the point there is a recess or open eye 226, Figs. 6, 7, and 8, having the forward projecting prong 227 at its rear side. On both sides of the needle-shank behind this open eye there are grooves 228 to receive the thread and reduce the tension on the thread when the needle is pushing the thread through the broom. The thread lies in these grooves on both sides of the needle and is protected thereby from undue friction. On the left side of the needle just in the rear of the open eye the needle is sunk or cut away, as shown at 229, this recess being a little deeper than the bottom of the groove 228, and it is cut with a slightly-inclined face, so as to readily allow the unthreading-hook to pass down between the needle and the thread. It is within the scope of my invention to place the prong and the recess for the unthreading-hook at any point or side of the needle so long as the prong can engage with and press the thread through the broom and the unthreading-hook can catch into the loop, and the same is also true of the threading and looping members 90. The location of the open eye on the under side of the needle is naturally preferable; but it may, for example, be on the upper side of the needle, the motions imparted to the needle being changed to correspond.

The sewing-needles are adjustably attached to the needle-head so that the distance between them can be varied to accommodate the machine to the sewing of brooms with any distance between binding-strands that is desired, and in like manner the looping-needles 90 are adjustably set into their needle-head so as to correspond with the position of the sewing-needles. The threading-hooks 152 and the unthreading-hooks 230 are readily adjusted to any of the spacing of the sewing-needles by bending them. These unthreading-hooks 230 are carried by the lever-arm 53. Set into the head of each arm 53 are the rock-shafts 231, corresponding to the number of needles, to which are fastened the unthreading-hooks 230 on one side of the arm-head, and at the opposite side there are the rearwardly-extending arms 232, all coupled together by the common bar 233, which bar carries at its lower end a pawl 234, designed to engage with the under inclined face of a stationary lug 235, carried by the frame of the machine, when the unthreading-arm makes its forward movement and lift the unthreading-hooks by pulling the bar down. The pawl 234 is so hinged to the bottom of the bar 233 that on the return movement of the arm 53 it will swing up and ride over the lug 235. Above the bar 233 there is a tension-spring 236, which holds the bar up and the hooks 230 down in their normal position when not raised by the action of the pawl aforesaid.

A modified form of a hook is illustrated by Figs. 35 and 36, in which the hook 237 extends out from the side of its arm and downward and rearward and is provided with a small roller 238 to assist the running of the thread.

A further modification is illustrated by Figs. 37 and 38, Sheet 11. In this case the shank 239 of each hook is rotated as a rock-shaft, and it carries at its end a lateral projecting hook 240. The rock-shaft shank 239 extends back through the head 241, carried by the unthreading-arm 53, and is provided at its rear end with a laterally-extending arm 242. These arms are all connected by the common bar 233, before mentioned, and by the vertical displacement of said bar through the action of the pawl the several hooks will be given a partial rotation on their axes, carrying the points down within the recess 229 in the side of their coöperating and opposed needles behind the thread, thus hooking the threads which have been pushed through the broom and unthreading the needles and pulling the threads through on the back stroke of the arm 53.

To receive the long loose threads drawn through the broom by the unthreading-hooks and guard against their becoming entangled with each other, there is attached to the frame a tubular receptacle for each of the loose threads, into which the thread is pulled by the unthreading-hook when it makes its back stroke. These thread-holders are shown in detail by Figs. 39, 40, and 41, Sheet 11. The four curved tubes 244 have the same radius as the arc transcribed by the unthreading-hooks, and they are to be attached to the top frame in line with and parallel to the sweep of the hooks. Each tube, one for each hook, has a curved slot 245 in its side wall along the upper edge, through which the hook projects, the hook passing through the tube when making its forward stroke, and on the back stroke the loose thread is drawn into the tube.

The construction of the looping-needles 90 of the binder will be seen by reference to Figs. 42 to 44. In the end of the needles there is a notch 250 with a forward projecting point 251 below the same. Back a short distance on the under side of the needle there is the mouth 252 to an open eye 253, which extends forward from the mouth and has a small hook projection 254 on the lower side. The height of this projection 254 is about equal to the thickness of a strand of the binding and sewing twine or thread, and behind said projection the needle slopes down to the point 255.

Adjustably fastened to the right-hand rear clamp-carrier 178 (see Figs. 23, 24, and 25) there is an auxiliary thread-holder 256 for holding the thread after the binding operation is completed and until the first stitch is taken. This thread-holder has a series of spring-clips 257, one for each thread, and it can be moved on the carrier parallel to the axis of travel of the vise, so as to set it according to the width of the broom. This thread-holder sets in close to the face of the clamps 179.

Attached to the top frame of the sewing-machine there is a vertical rod 258, carrying a gang of tension-springs or spring-clips similar to those just described constituting the main thread-holder. These catch and hold the threads when they are drawn through behind the spring-clips by the unthreading-hooks 230.

There remains now to be described the starting mechanism and the connections for securing the successive operations of the different parts of the machine, which will be best understood by reference to Figs. 30 to 34. Below the rock-shaft 62 there is an arm 260, an extension of the hand-lever 63, to which are attached two opposed tension-springs 261 and 262, which normally hold the lever 63 in its central position. These tension-springs at their outer ends are attached to the frame of the machine. Said rock-shaft also has a short lateral arm 263, to which is attached a spring-rod 264, that extends up to the lever-arm 167, so that the friction-pinion 168 is thrown against the friction-disk 169 when the starting-lever is pulled backward to throw in the clutch for driving the sewing mechanism. A lug 265 on an extension 266 of the lever 167 forms a stop for the forward movement of the vise when the sewing-clutch is not thrown in and the lever-arm 167 is up. When the starting-lever is operated to start the sewing, the depression of the lever 167 raises the lug 265, so that the vise can pass it. This lug determines the starting-point of the vise when the sewing commences.

267 is a catch with which a pawl 268, carried by the starting-lever, engages to prevent the lever 63 from being pulled back by the spring 262 after the clutch which engages the threading and binding mechanism has been thrown in. This catch is connected by a rod 269 with a lever 270, which is acted upon by a lug 271 on the cam-wheel 80. When the lug 271 strikes the end of the lever 270 at the end of the binding operation, the catch 267 releases the starting-lever, and the latter is drawn back by the spring 262 to its central or normal position. Carried by the binder-frame at the other end of the arc transcribed by the starting-lever there is a catch 272, normally held projected by a spring 273, and a pawl 274, carried by the starting-lever, engages with this catch when the handle is drawn back for starting the sewing mechanism. Connected to a bell-crank arm of this catch there is a rod 275, leading back to a lever-arm 276, which has an adjustable head 277, which is struck by the vise-body when the last stitch has been taken, thereby releasing the starting-lever, and the same is returned to its central position by means of the spring 261, and the swing-clutch is thrown off. Further, to allow for changing the distance between the rows of stitches not only the sewing-needles and threading and unthreading hooks are made adjustable, as before indicated, but also the tucking and looping needles and thread-guides of the threading-head, which present the several threads in front of the tucking-needles and the thread-holders for the several strands, both the auxiliary and the main thread-holder. The tucking and looping needles may be held in their head, as well as the sewing-needles and threading-hooks in their respective heads, between serrated clamps, which will allow the shanks of the needles and hooks to be set at any point between the serrated clamps and firmly clamped. The cone-needle guides for the threads as they leave the threading-hooks can be in like manner adjustably attached to the threading-head. These adjustable attachments will be readily understood without being specifically illustrated.

Suitable means may be provided for lubricating the needles, detecting knots in the thread, and counting the number of brooms sewed.

The operation of the machine is as follows: At the start, assuming the vise to be in the position shown in Fig. 2 of the drawings, it is swung on its trunnions 216 and 217 over into the binder, its inclined position then being parallel with that of the starting-lever 63 as the latter is shown in Fig. 2, and the spur-gear 220 is then in mesh with its driving-gear 77. The vise-jaws are then opened by pressing with the foot on the foot-lever 223, which raises the primary foot-lever and draws down the collar 206 and opens the vise, at the same time the operator pulling back the clamp-hooks 186, so that the auxiliary jaw-bars 179$^a$ 179$^b$ will remain attached to their respective carriers as the jaws open. The operator then places a broom ready for binding and sewing in the vise, the handle extending down within the hollow shaft 205 and the broom-head resting in the socket 221. The proper position of this broom is regulated by setting this socket at the desired height. The operator then presses the foot-lever 212 downward, thereby closing the vise-jaws and centering the broom. When the vise-jaws close, the auxiliary jaws lock together around the broom, the hooks 186 on one set of jaw-bars engaging with the notched ends of the other set of bars. In this position of the vise the lugs 189 of the crank-collar 184 are in engagement with the socket-wrench 188, and if the auxiliary jaws and their carriers are in an open position with respect to the main jaws when the latter are closed by the foot-lever 212 the operator closes them by means of the handle 191. He then turns the handle 191 back, bringing the slot of the socket-wrench 188 in a horizontal position and throwing the carriers 178 back and out of the way of the threading mechanism, the auxiliary jaws 179 remaining attached to the broom by reason of the spring-bolts 185 drawing out of the eyes of the carriers. In this position the broom is ready to have the free ends of the binding-threads pushed through or to be threaded. The operator grasps the starting-lever 63 and pushes it from him, thereby throwing in the clutch 66 and starting the binding mechanism. The pawl 268 of the starting-lever catches on the detent 267 and locks the operating-lever until it is automatically released at the close of the binding operation by the lug 271 striking the lever 270 and causing the detent 267 to be retracted.

In the progress of the binding operation the first step is the action of the cam 97 on the threading-head lever 95, which swings the threading-head 106 around in front of the gang of looping-needles 90. When the threading-head is making its forward stroke, the friction-wheel 114 engages during a part of the time with the arc-shaped plate 116, causing the roller 111 to revolve and advance the ends of the threads through their funnel-guides and past the needle-slot 109.

The looping-needles, actuated by the cam 80, are then advanced, and after the threads have been brought into position in front of them each needle catches its thread in the front notch 250 and pushes the loose end of the thread well into or through the broom. The needles then recede, leaving the ends of the threads in the broom, and both the needles and the threading-head swing back out of the way of the vise. The rotation of the vise by means of the segment-gear 78 and gears 76, 77, and 220 then takes place, winding the threads around the broom. The vise then comes to rest, and the lug or tooth 196 on the cam-wheel 80 strikes the arm 195 and causes the closing of the clamp-carriers, and the adjustable thread-holder 256 is brought in the path of the needles. The flange 84 now moves the lever-arm 85, and with it the rock-shaft 86 and the looping-needle arm and needles, a short distance inward to clear the tucked end of the thread, and the said needles advance again, their points being slightly raised by the action of the cam on the lever 85, so that they will pass above the binding-strings wound around the broom. The cam action on the needles then following is illustrated by Figs. 42, 43, and 44. The needles advance into the broom until the point 255 is within the broom, as illustrated by Fig. 42, when the needles move downward and then outward for a short distance, bringing the binding-strands of the threads 280 and 281 within the open eye 253 of the needle. In this position the strand of the thread 281, extending around the broom to the threading-head, is caught by the hook 254. (See Fig. 43.) The cam action then causes the needles to move forward, carrying the thread 281 along with it into the broom-body, and as soon as the point 255 of the needle can clear the strands 280 the needle is given an upward motion, Fig. 44, and then outward, carrying the strand 281 around the strands 280 and drawing it out. The needles then receive a downward motion, which causes a free loop of the strand 281 to catch in the temporary thread-holder 256. The needles then recede into their stationary position. At this stage the lug 271 causes the detent 267 to release the hand-lever 63, which then is brought by the spring 262 into its central position, throwing out clutch 66 and stopping the binding mechanism. The operator then pushes the vise from him until it is stopped by the lug 265, and it is then in position for sewing. He then pulls the lever 63 toward him until it passes the detent 272 and is caught thereby. This action throws in the clutch 58, which starts the sewing mechanism, and also by reason of the connection with the lever 167 the stop 265 is moved out of line of the portion of the vise-body which strikes it, and the friction-pinion 165 is brought up against the friction-disk 169, thereby throwing into action the feed mechanism for the vise. The threads are then in position to be caught by the hooks 152, which acted upon by the cams 140 141 move the threads downward and backward, bringing them under the gang of sewing-needles. Then while the sewing-needles advance the hooks 152 raise the threads and bring them into the recesses or open eyes 226. The tension of the threads is sufficient to allow of a ready disengagement of the hooks from the threads, the hooks still moving in a vertical direction. The needles which have thus been threaded slide over the inclined surface of the vise and clamps the bottom needle just above the edge of the main jaw and the upper needles each above one of the auxiliary jaws, their points passing under the binders on the entering side of the broom and out over the binders on the other side of the broom. The threads while being pushed through the broom rest in the grooves 228 of the needles. During the time that the sewing-needles on one side are advancing the unthreading-hooks on the opposite side are advanced, and when both finish their respective strokes the pawl 234 of the unthreading-head will pass under the inclined plane of its coacting lug 235, slightly raising the hooks. They then enter the respective recesses 229 of the needles and wedge in between the needles and the threads. The needles and the unthreading-hooks then both make their back strokes, and the threads drawn through the brooms are caught by the stationary thread-holder 258 and the loose ends drawn out into the thread-tubes 244. The spur-gear 171, driven by the friction-disk and pinion 169 and 168 and the toothed wheel 162, feeds the vise forward one stitch. The drawing of the threads through the threading-head 106 during the process of winding and tying causes the cones 118 to revolve, and the studs 127 are adjusted so that the cones will carry the knives 125 past their centers and cut the threads when the proper length required for the sewing of a row of stitches has run through. The threading and sewing operation is then repeated by the other gang of needles and hooks and the vise advanced step by step until the required number of stitches has been sewed. After the sewing of the last stitch the vise strikes the stop 277, the catch 272 is withdrawn, and the hand-lever 63 returns to its normal and central position, disengaging the sewing-clutch. The operator then swings the vise back into the binder, throwing off the hooks on the auxiliary jaws, opens the auxiliary jaws and carriers by the handle 191, and opens the main vise by means of the foot-lever 223.

Having thus described the invention, what I claim is—

1. In a broom-sewing machine, a rotatable broom-holding vise combined with means for holding the thread in proper relation to said vise, and means for rotating the vise to wind the binders upon a broom, substantially as described.

2. In a broom-sewing machine, the combination with a rotatable vise, of means for holding a series of threads in proper relation to said vise, and means for rotating the vise to wind said threads upon a broom and simultaneously form a plurality of binders thereon, substantially as described.

3. In a broom-sewing machine, the combination with a rotatable vise, automatic means for inserting the ends of the thread in a broom held in said vise, and means for rotating the vise to form a binder upon the broom, substantially as described.

4. In a broom-sewing machine, the combination of a rotatable vise, means for inserting the ends of a plurality of threads in a broom held by said vise, and means for rotating the vise to form a plurality of binders simultaneously upon the broom, substantially as described.

5. In a broom-sewing machine, a rotatable vise, in combination with means for inserting the ends of a plurality of binders in the broom held by the vise, means for simultaneuosly winding said binders upon the broom, and a plurality of needles and operating mechanism therefor adapted to sew a plurality of seams simultaneously, substantially as described.

6. In a broom-sewing machine, a vise, and means for rotating the vise, in combination with means for opening and closing the vise so related to said vise that the rotation of the vise will not affect the closing means, and a treadle adapted to operate both the means for opening and means for closing the vise, substantially as described.

7. In a broom-sewing machine, a shaft mounted in suitable bearings, vise-jaws connected to said shaft, a collar sliding on the shaft and suitably connected to the jaws to open and close the same, a treadle connected with said collar, and means for rotating the shaft, substantially as described.

8. In a broom-sewing machine, a shaft, vise-jaws connected to the end of said shaft, a collar sliding on said shaft, toggle-links adapted to be operated by movement of the collar upon the shaft, connections between the toggle-links and the vise-jaws, and means for bringing the toggle-links approximately into line to close the vise-jaws, substantially as described.

9. In a broom-sewing machine, the combination of a rotary shaft, vise-jaws connected thereto, toggle-links connected to the vise-jaws, a sliding collar on the shaft connected to the toggle-links, a treadle for operating said collar in one direction to close the vise-jaws and a second treadle arranged to open said jaws, substantially as described.

10. In a broom-sewing machine, the combination of a vise, means for inserting the end of a binder in a broom supported by the vise, means for rotating the vise to wind the binder on the broom supported therein, sewing mechanism adapted to act on the broom after the binder is applied thereto, and means for moving the vise step by step while the sewing mechanism is in action.

11. In a broom-sewing machine, the combination of a vise, mounted to be moved about two axes, means for rotating the vise about one axis to wind a binder on a broom supported therein, sewing mechanism, a gear engaging teeth on the vise and adapted to move it step by step about the other axis while the sewing mechanism is operating, and a driving-shaft for actuating both said gear and the means for rotating the vise.

12. In a broom-sewing machine, the combination of a vise mounted to be moved about two axes, a power-shaft, and two trains of gearing actuated by said shaft and each adapted to move the vise about one of said axes, whereby said shaft is adapted to rotate the vise to wind a binder on a broom supported therein, and also to move the vise and broom supported thereby while the sewing mechanism of the machine is operative.

13. In a broom-sewing machine, the combination of a vise, mounted to be moved about two axes, a driving-shaft, a train of gearing adapted to connect said shaft and vise and rotate the latter about one axis, a second train of gearing adapted to connect the vise and shaft and to intermittently move the vise about its other axis, and means for moving the vise into engagement with either of said trains of gearing.

14. In a broom-sewing machine, the combination of a vise, and relatively adjustable friction devices for feeding said vise to space the stitches, whereby the length of space between stitches can be varied as desired independent of any variation in the relation of the jaws of the vise.

15. In a broom-sewing machine, the combination of a vise, means for feeding said vise to space the stitches, including a friction-disk geared to the vise, and means for rotating said disk at different speeds, substantially as and for the purpose described.

16. In a broom-sewing machine, the combination of a vise, a gear or rack connected with said vise, a pinion meshing with said rack and connected with a friction-disk, and a friction driving-wheel coöperating with said disk and adapted to be adjusted to and from the axis thereof, substantially as and for the purpose described.

17. In a broom-sewing machine, the combination of a vise, a gear or rack connected with the vise, a pinion connected with a friction-disk and adapted to engage the gear or rack connected with the vise, an intermittently-rotating shaft, and a friction-wheel mounted on said shaft and coöperating with said disk, substantially as described.

18. In a broom-sewing machine, the combination of a vise, a gear or rack connected with the vise, a pinion connected with a friction-disk and adapted to engage the gear or rack connected with the vise, an intermittently-rotating shaft, and a friction-wheel mounted on said shaft and coöperating with said disk, said wheel being adjustable longitudinally of the shaft to and from the axis of the disk, substantially as and for the purpose described.

19. In a broom-sewing machine, the combination of a pivotally-mounted vise, a needle supported at one side of the vise and adapted to push a thread through a broom held therein, a reciprocating device for unthreading the needle supported on the opposite side of the vise, and means for rocking the vise with a step-by-step movement about its pivot.

20. In a broom-sewing machine, the combination of a pivotally-mounted vise, adapted to hold a broom to be sewed, a needle supported at one side of the vise and adapted to push a thread through the broom held therein, a device on the opposite side of the vise for unthreading the needle, means for simultaneously moving said needle and unthreading device toward and from the vise, and means for moving the vise and broom step by step about the vise-pivot.

21. In a broom-sewing machine, a broom-holding vise, in combination with means for simultaneously applying a series of binders, and means for sewing a series of seams in conjunction with said binders simultaneously, substantially as described.

22. In a broom-sewing machine, in combination with a vise, a series of devices for inserting the ends of threads in a broom, a series of needles, a series of threading devices for said needles, and a series of unthreading devices therefor, substantially as described.

23. In a broom-sewing machine, the combination with a movable hanger and a broom-holding vise adapted to revolve in bearings in said hanger, of binder mechanism and sewing mechanism operatively arranged with respect to the movable vise, said vise-hanger being shiftable from one mechanism to the other for the successive operations of winding and sewing, substantially as set forth.

24. In a broom-sewing machine, the combination with an oscillating hanger and a broom-holding vise adapted to revolve in said hanger, of binder mechanism and sewing mechanism operatively arranged with respect to the oscillating hanger and movable vise, said vise-hanger being arranged to carry the vise from one mechanism to the other for the successive operations of winding and sewing, substantially as set forth.

25. In a broom-sewing machine, the combination of a broom-holding vise having main jaws, carriers hinged thereto and arranged to close above the main jaws independently thereof, and one or more pairs of clamp-bars removably attached to said carriers, substantially as set forth.

26. In a broom-sewing machine, a vise having adjustable main jaws in combination with auxiliary, independently-movable clamps carried thereby, and automatic means for simultaneously closing said clamps, substantially as set forth.

27. In a broom-sewing machine, the combination of a vise, means for closing the jaws of the vise upon a broom, auxiliary clamps connected to the aforesaid jaws to move therewith to clamp a broom and adapted to be detached from the vise as the jaws thereof are opened, means for simultaneously winding a plurality of binders upon the broom, and means for sewing a plurality of rows of stitches.

28. In a broom-sewing machine, the combination of a vise, means for closing the jaws of the vise upon a broom, auxiliary clamps detachably connected to the jaws of the vise and adapted to move therewith to engage a broom clamped by said jaws, means for connecting said clamps when in position to engage the broom, whereby said clamps may be retained in engagement with the broom when the vise is opened and the jaws are moved from the broom, means for simultaneously winding a plurality of binders upon the broom, and means for sewing a plurality of rows of stitches.

29. In a broom-sewing machine, a broom-holding vise having one or more pairs of auxiliary interlocking jaws carried by the jaws of the vise, in combination with a binder having one or more threading-needles, and means for releasing the auxiliary jaws from connection with the vise, and revolving the vise, substantially as set forth.

30. In a broom-sewing machine, the combination with a broom-vise, and clamp-carriers coöperating with said vise, of a wrench adapted to engage with and operate the clamp-carriers, said wrench having lateral openings to admit of the revolution of the vise, substantially as set forth.

31. In a broom-sewing machine, the combination of a supporting-frame having suitable guideways formed therein, a vise-frame having side guides sliding in said ways on the supporting-frame, a vise mounted in said vise-frame, and movable therewith, and means for revolving the vise within the vise-frame.

32. In a broom-sewing machine, a vise, in combination with a spring-support therefor, and a stop-collar to fix the position of the vise and keep the upper face of the jaws in line with the lower edge of the needles, substantially as set forth.

33. In a broom-sewing machine, the combination of a vise attached to a rotatable shaft, a collar sliding on said shaft, and links connecting the collar with lever-arms of the vise-jaws, said parts being constructed to allow for self-adjustment, substantially as set forth.

34. In a broom-sewing machine, the combination of a broom-holding vise carried on a shaft supported in a movable hanger, a collar sliding on said shaft and connected by arms to the jaws of the vise, and a vise-operating lever connected with said collar, the pivot connections of the lever being in line with the bearings of the hanger when the vise is closed, together with a gear carried by said shaft, with a binding mechanism having a gear with which the vise-gear engages when the vise is swung into position for binding, substantially as set forth.

35. In a broom-sewing machine, the combination of a shiftable broom-holding vise having auxiliary jaws, and hinged carriers for said jaws, of a carrier-operating head carried by the vise, and a wrench-socket carried by the binder, with means for rotating the wrench, substantially as set forth.

36. In a broom-sewing machine, the combination of a vise attached to a shaft, a collar sliding on the shaft, links and levers connecting the collar with the vise-jaws, and an operating-lever connected to the sliding collar, substantially as set forth.

37. In a broom-sewing machine, the combination of a vise attached to a shaft, a collar sliding on the shaft, links to connect said collar and the vise-jaws, a vise-operating lever connected with said collar, and a secondary operating-lever connected with said operating-lever, substantially as set forth.

38. In a broom-sewing machine, the combination with a broom-holder, suitable needles, a threading head or guide adapted to supply thread to the needles, and an intermittent thread-feeding device, of a thread-cutter, substantially as set forth.

39. In a broom-sewing machine, the combination of a broom-holder, means for winding a binder upon a broom supported by said holder, means for feeding thread to the winding mechanism, means for cutting the thread to a proper length for stitching the binder to the broom, and means for stitching the binder to the broom.

40. In a broom-sewing machine, the combination of a broom-holder, means for winding a binder upon a broom supported by said holder, sewing mechanism for stitching the binder to the broom, means for supplying thread to said winding and sewing mechanism, and means for cutting said thread to the proper length for forming a binder and the stitches required to connect the binder to the broom.

41. In a broom-sewing machine, the combination of a broom-holder, a needle, a tubular thread-guide having a transverse passage through which the needle is adapted to move, and an intermittent thread-feeding device adapted to feed a thread longitudinally of said guide.

42. In a broom-sewing machine, the combination of a broom-holder, a needle movable transversely of said holder, a thread-guide at the side of the holder and through which the needle is adapted to pass, and means for feeding a thread through said guide transverse to the path of the movement of the needle, substantially as set forth.

43. In a broom-sewing machine, the combination of a broom-holder, a plurality of needles movable through a broom supported in the holder, a thread-guide adapted to support a thread in the path of each needle, and an intermittently-acting device for simultaneously feeding thread longitudinally of each of said guides.

44. In a broom-sewing machine, the combination of a broom-holder, a plurality of needles, a thread-guide adapted to support a thread in the path of each needle, an intermittently-acting device for feeding thread longitudinally of each of the guides, and a thread-cutting device adjacent each guide.

45. In a broom-sewing machine, the combination with a broom-holder and suitable thread feeding, measuring and cutting devices, of adjustable thread-guides, whereby the machine is adapted for sewing brooms having different distances between the rows of stitches.

46. In a broom-sewing machine, the combination with a shifting broom-holding vise having one or more sets of detachable auxiliary jaws, and a thread-holder carried by the vise contiguous thereto, of thread looping and binding mechanisms, and a sewing mechanism, substantially as set forth.

47. In a broom-sewing machine, the combination with a broom-holding vise, of a needle having a notch in the forward end thereof, means for holding a thread between a broom supported in the vise and said notch in the needle, and means for moving the needle longitudinally to cause the notch in the end thereof to receive the thread and push it into the broom held by the vise, substantially as set forth.

48. In a broom-sewing machine, the combination with a broom-holding vise, of a gang of needles attached to a needle-head and adapted to push the ends of the threads through a broom in one direction for the several rows of stitches, and means for carrying the threads through the broom in the opposite direction, substantially as set forth.

49. In a broom-sewing machine, the combination with a broom-holding vise, of a gang of looping-needles attached to a head and simultaneously movable, means for holding a thread between each of said needles and a broom supported by the vise, and means for moving said needle-head to cause the needles to force said threads into the broom, substantially as set forth.

50. In a broom-sewing machine, the combination with a broom-holding vise, of a gang of looping-needles, means for causing said needles to secure a series of binders to a broom held in the vise, and means for sewing as many rows of stitches as there are binders on the broom, said looping-needles being adjustable to vary the distances between binders or rows of stitches, substantially as set forth.

51. In a broom-sewing machine, the combination with a broom-holding vise, of a needle, and an auxiliary thread-holder laterally adjustable with respect to the vise, substantially as set forth.

52. In a broom-binding machine, the combination of a broom-holding vise carrying a thread-holder, a threading-head, a reciprocating needle, mechanism to advance the thread-head in front of the needle and withdraw it, and mechanism to rotate the vise, substantially as set forth.

53. In a broom-binding machine, the combination of a broom-holding vise, a movable threading-head, and a reciprocating looping-needle, said threading-head having a feed-wheel for the thread adapted to engage with a stationary piece of the machine when the threading-head makes its stroke to advance the thread, substantially as set forth.

54. In a broom-binding machine, the combination with a broom-holder, and a suitable needle, of a threading-head having a friction-wheel, a thread-cutter rotated by said wheel, and a guide to carry the thread against the wheel as it is drawn through the head, substantially as set forth.

55. In a broom-binding machine, the combination with a broom-holder, and a suitable needle, of a threading-head having a friction-wheel, a thread-cutter rotated by said wheel, and an adjustable guide for the thread to regulate the speed of rotation of the friction-wheel by the thread as it is drawn through the head, substantially as set forth.

56. In a broom-binding machine, the combination of a broom-holder, a reciprocating needle having its bearing supported on a rock-shaft, means for supplying a binder-thread to the needle, means adapted to reciprocate the needle to insert the binder in the broom supported by the broom-holder, and means adapted to rock the shaft supporting the bearing for said needle.

57. In a broom-binding machine, the combination of a broom-holder, means for supplying a binder-thread to the needle, means adapted to reciprocate the needle to insert the thread carried thereby in a broom supported by the broom-holder, and means for adjusting said needle transversely to its line of reciprocation, whereby it is adapted for use with brooms of different widths.

58. In a broom-binding machine, the combination of a broom-holder, a needle having its bearing supported on a rock-shaft, means for supplying a binder-thread to the needle, means adapted to reciprocate the needle to insert the binder-thread carried thereby in a broom supported by the broom-holder, means adapted to rock the shaft supporting the needle-bearing, and means for adjusting said bearing longitudinally of the rock-shaft.

59. In a broom binding and sewing machine, the combination with a broom-holding vise and means for revolving it, of a cam-wheel controlling the binding operation of the machine and having a segmental bevel-gear, a bevel-pinion driven thereby, and a spur-gear on the pinion-shaft with which the vise-revolving mechanism can engage, substantially as set forth.

60. In a broom-sewing machine, the combination with a shiftable vise and suitable stitch-forming mechanism, of a retractable adjustable stop to determine the position of the vise for the first stitch, substantially as set forth.

61. In a broom-sewing machine, the combination with a gang of needles, of a gang of unthreading-hooks having a rearward, downward and upward motion, and means for operating said needles and hooks, substantially as set forth.

62. In a broom-sewing machine, the combination with a broom-holding vise, of the reciprocating needles, the opposed unthreading-hooks, and means for operating said hooks in a plane across the path of the needles, substantially as set forth.

63. In a broom-sewing machine, the combination with the broom-holding vise and the sewing-needles, of the threading-hooks carried by a head connected by parallel links with an upwardly-movable frame, and a rod adapted to first rock the links and then lift the frame to operate said hooks upwardly, substantially as set forth.

64. In a broom-sewing machine, the combination with a needle, an unthreading-hook carried by an arm, and a pawl connected therewith, of a stationary lug in the path of the pawl and adapted to strike the same and raise the point of the hook, substantially as set forth.

65. In a broom-sewing machine, the combination with independently-adjustable sewing-needles, of adjustable threading-hooks, whereby the distance between rows of stitching may be varied, substantially as set forth.

66. In a broom-sewing machine, the combination of a pair of needle-heads, sliding in guides, and each head carrying one or more needles, a pair of levers, rods connecting said lever to the needle-heads, unthreading-hooks each adapted to engage with the thread pushed through the broom by its coöperating needle, a pair of levers connected to and operating said hooks, and a cam-wheel controlling the movements of all said levers.

67. In a broom-sewing machine, the combination with a gang of pronged needles adapted to push the threads through the broom, of a gang of unthreading-hooks adapted to remove the threads from the needles while the latter are within the broom, substantially as set forth.

68. In a broom-sewing machine, the combination with a series of needles, of a gang of unthreading-hooks adjustably set in a hookhead to accommodate changes in the distance between rows of stitches, substantially as set forth.

69. In a broom-sewing machine, the combination with a broom-holder, and means for passing a thread through a broom held in said holder, of a guard to receive and hold the free end of the thread when drawn through the broom, substantially as set forth.

70. In a broom-sewing machine, the combination with a needle and an unthreading-hook, of a thread-guard into which the thread is drawn to preserve it from entanglement, substantially as set forth.

71. In a broom-sewing machine, in combination with a series of needles, a gang of adjustable stationary thread-holders, substantially as set forth.

72. In a broom-sewing machine, the combination with the feed-rack, of the broom-holding vise, a pinion engaging therewith, a friction-disk attached to said pinion, an adjustable friction-wheel coöperating with the disk, and means for intermittently revolving the pinion, substantially as set forth.

73. In a broom-sewing machine, the combination with the friction feed-disk for the broom-holding vise, of a friction-wheel, a shaft having an intermittent motion carrying said wheel, an adjustable hanger for said shaft, and means for adjusting said hanger to throw the wheel into and out of contact with the disk, substantially as set forth.

74. In a broom-sewing machine, the combination with a driving-wheel having a projecting lug or dog, of the toothed wheel driven thereby, the shaft therefor arranged eccentric to the driving-wheel, and the pinion carried by said shaft and connected to drive the feed device of the broom-holding vise, substantially as set forth.

75. In a broom binding and sewing machine, the combination with binding mechanism and sewing mechanism, of a starting-lever normally held in a central position and having starting connections with the binding mechanism on one side and the sewing mechanism on the other, and oppositely-placed detents adapted respectively to lock the starting-lever when thrown to either side, substantially as set forth.

76. In a broom binding and sewing machine, the combination with binding mechanism, sewing mechanism, and the starting-lever, of the clutch for the binding mechanism, the clutch for the sewing mechanism, the opposed springs attached to the starting-lever, the detents at the ends of the starting-lever's stroke, and means for retracting said detents, one by the binding mechanism when the binding is completed, and the other by the sewing mechanism when the sewing is completed, substantially as set forth.

In testimony whereof I affix my signature in presence of two witnesses.

ANDREW E. MILLER.

Witnesses:
HERBERT CASSARD,
STORY B. LADD.